Patented Oct. 23, 1928.

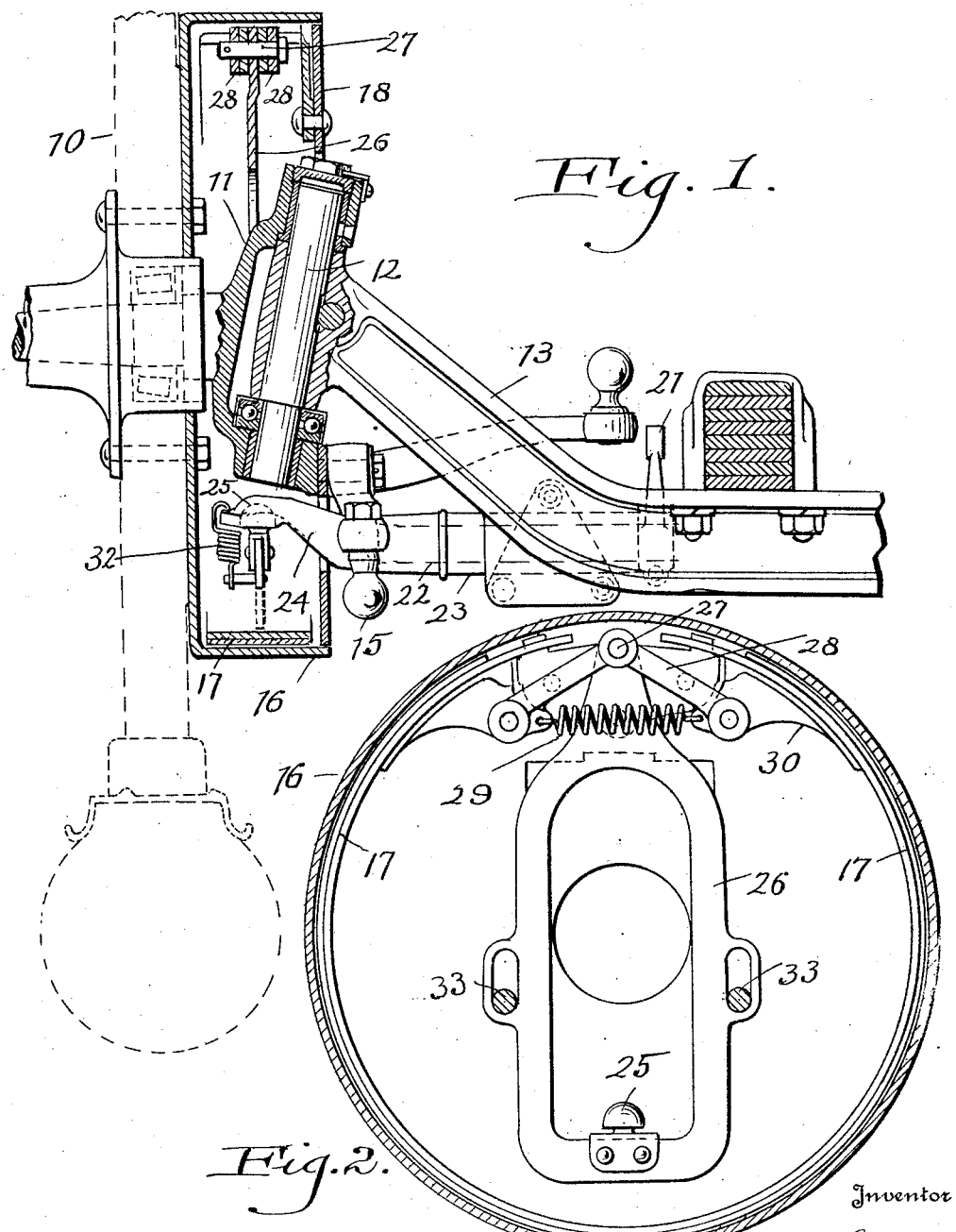

1,688,358

UNITED STATES PATENT OFFICE.

FREDERIC W. SLACK, OF CLEVELAND, OHIO, ASSIGNOR, BY MESNE ASSIGNMENTS, TO THE PEERLESS MOTOR CAR CORPORATION, OF CLEVELAND, OHIO, A CORPORATION OF VIRGINIA.

VEHICLE BRAKE.

Application filed April 14, 1924. Serial No. 706,319.

This invention relates to an improvement in brakes for the front or steering wheels of motor vehicles, and has for its chief object to provide a brake operating mechanism which will enable the brake to operate satisfactorily regardless of the position which the wheel may be in when the brake is applied, and in spite of the occurrence of wear in the brake band, and which at the same time does not embody parts difficult to make or assemble.

The invention may be briefly summarized as consisting in certain novel details of construction and combinations and arrangements of parts which will be described in the specification and set forth in the appended claims.

Figure 3:
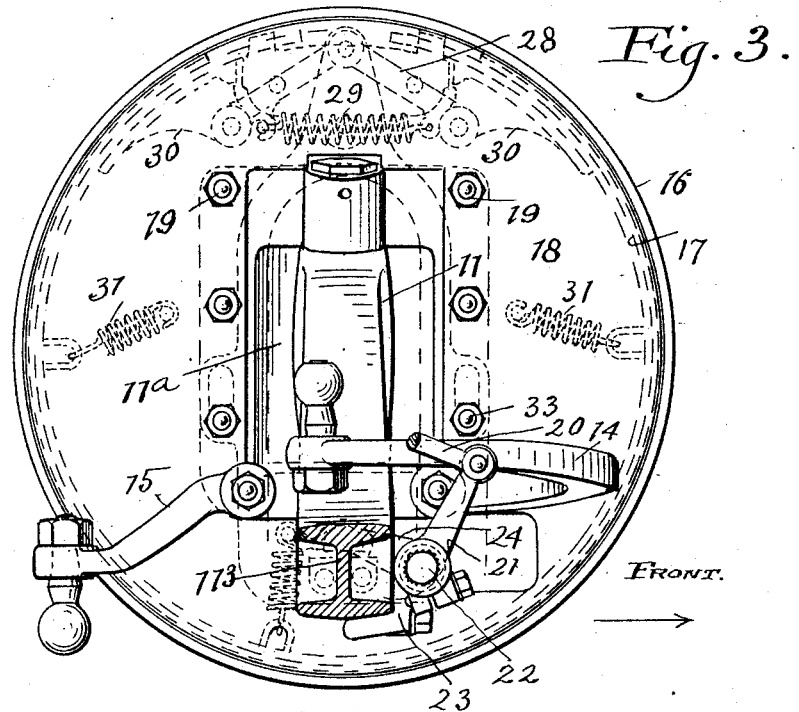

In the accompanying sheet of drawings, wherein I have shown the preferred embodiment of the invention, Fig. 1 is a vertical sectional view through a brake embodying my invention, this view showing a part of the front axle and a part of the wheel; Fig. 2 is a sectional view with certain parts omitted and illustrating particularly the brake applying member; Fig. 3 is a view looking toward the inside of the brake with the brake in dotted lines and with the axle in section, and Fig. 4 is a horizontal sectional view.

Referring now to the drawings, 10 represents the front wheel of the motor vehicle which is supported by means of a knuckle 11 pivotally connected by means of the usual inclined king pin 12 to the end of the front axle 13. The knuckle is provided with the usual steering levers or arms 14 and 15, the former of which is adapted to be connected to the steering gear in the well known manner, and the arm 15 serving to transmit motion from one knuckle to the other.

The wheel has attached to it a brake drum 16 on the inner side of which is a brake band 17, my invention being applicable particularly to a brake of the internal type. The front or inner side of the drum is closed by a disk 18 which as shown particularly in Figs. 3 and 4, is cut away at the center to accommodate the outer part of the knuckle 11 and king pin 12, as well as the king pin bearing at the end of axle 13. The marginal part of this plate around the opening referred to, is secured by bolts 19, to the knuckle, or to a flange-like extension thereof including a curved or U-shaped portion 11ª thereof, shown in Fig. 4, so that the front of the brake drum is completely housed by this disk 18 and by the knuckle, or that portion thereof which is shaped and extended to form a clamping face for the disk and to form a closure for that part of the disk which is cut away to accommodate the knuckle and king pins as stated above.

Figure 4:
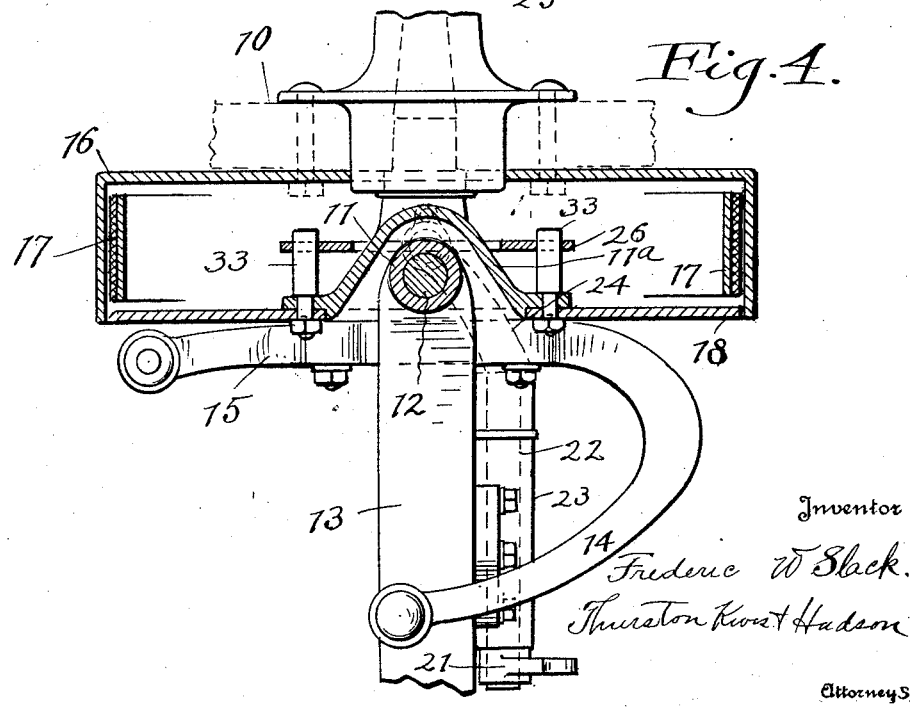

The brake operating member, which is usually the foot pedal, is connected by suitable parts or members, including a rod 20, a portion of which is shown in Fig. 3, to a lever 21 shown in Figs. 1, 3 and 4, and secured to a rock shaft 22 rotatably supported in a suitable rock shaft bearing 23, secured to and extending along a portion of the axle 13. The inner end of this rock shaft has attached to it a brake operating arm or lever 24 which extends into the lower part of the brake drum through an opening in the lower part of the disk 18, the inner end of this lever being beneath and substantially in line with the king pin. The end of this lever beneath the king pin has a socket on the under side, and this fits onto a spherical member 25, (see Figs. 1 and 2), which member is secured to the lower part of an elongated and rectangular shaped yoke 26 which straddles the knuckle 11 and extends up to the upper part of the drum where it is connected by a pin 27 to a pair of toggle links 28, which when straightened apply the brake to the inner cylindrical surface of the drum. The brake is held in contracted or released position by a spring 29 extending between brackets 30 secured to the ends of the brake band, the toggle links 28 being also secured to these same brackets. Other springs, indicated at 31 (see particularly Fig. 3) may be employed in conjunction with spring 29 to keep the brake band normally practically free of the drum.

When the brake is released, the arm 24 normally stands in the position shown in Fig. 1, the socketed part of this arm being held by a spring or equivalent yieldable member 32 in engagement with the spherical member 25 at the bottom of the yoke 26, and when the brake is applied, the movement of the arm 24 resulting from the movement of the foot pedal or other brake applying member is transmitted from a point at the lower part of the drum and beneath the king pin by the yoke 26 up past the knuckle and king pin to the upper part of the drum or to the toggle links 28.

The center of the spherical member 25 is, as shown in Fig. 1, substantially in line with the axis of the king pin 12, but it is not, nor can it be, in line with the axis of the king pin throughout the range of movement of the lever 24 with the wheel in all positions and throughout the life of the brake band, as the latter wears from use.

This mis-alignment would seriously affect the operation of the brake if the movement of the brake operating arm 24 were applied directly or close to the toggle links which apply the brake, but in view of the fact that the movement of this arm is transmitted from the lower part of the drum to the upper part of the yoke 26, and in view of the fact that this yoke possesses a certain amount of flexibility, any mis-alignment is fully compensated for and rendered altogether harmless before the movement is transmitted to the toggle links 28.

This yoke 26, which therefore acts as a flexible movement transmitting link, is supported at the top, as stated, and is also guided on pins 33 constituting, in this instance, extensions of two of the bolts which secure the disk 18 to the flange or knuckle as previously described, but neither the pin supporting the yoke nor the two guide pins deprive the yoke of its flexibility to the extent necessary to compensate for the mis-alignment mentioned above.

Therefore, by this mechanism the brake will operate satisfactorily regardless of the position to which the wheel is turned when the brake is applied, and regardless of whether the brake band is new or well worn.

Having described my invention, I claim:—

1. A brake for a steering wheel of a motor vehicle comprising a brake drum, a brake member adapted to engage the drum, a brake applying member, and a flexible member lying within the drum and connecting said brake applying member to said brake member.

2. In combination with a motor vehicle having a steering wheel adapted to be moved about an axis inclined to the plane of the wheel, a drum carried by the wheel, a brake member adapted to engage the drum, a movable brake applying member with respect to which the wheel and drum are adapted to turn, and a flexible link lying within the drum and connecting said brake applying member to said brake member.

3. In combination with a vehicle having a movable steering wheel, a king pin upon which the steering wheel is mounted to turn, a brake drum carried by the wheel, a brake member for engaging the drum, a brake applying member having an operating part adjacent the axis of the king pin, and means positioned within the drum and connecting said brake applying member to said brake member so as to compensate for mis-alignment between the operative end of said brake applying member and the axis of the king pin.

4. In combination with a vehicle having a movable steering wheel, a king pin upon which the steering wheel is mounted to turn, a brake drum carried by the wheel, a brake member for engaging the drum, a brake applying member having an operating part adjacent the axis of the king pin, and means comprising a flexible link connecting the operative end of said brake applying member to said brake member.

5. In combination with a movable steering wheel of a motor vehicle, a pivoted knuckle supporting the wheel, a brake drum carried by the wheel, a brake member adapted to engage the drum, a brake applying member having an operative part on one side of the axis of the wheel, a link extending to the opposite side of said axis in a direction parallel with the principal plane of the drum for transmitting motion from said brake applying member to said brake member, and guiding means carried by said knuckle and engaging said link.

6. In combination with a movable steering wheel of a motor vehicle, a pivoted knuckle supporting said wheel, a brake drum carried by the wheel, a brake band for engaging the drum, a brake applying member at one side of the knuckle, a second brake applying member on the opposite side of the knuckle, and a yoke straddling the knuckle and connecting said members, said yoke lying within said drum in a plane parallel with the principal plane of the drum.

7. In combination with the steering wheel of a motor vehicle, a pivoted knuckle supporting the same, a brake drum carried by the wheel, a brake band within the drum, a brake applying member with respect to which the wheel turns extending into the drum adjacent the pivotal axis of the knuckle, toggle means connected to the brake band and located in the drum distant from said brake applying member, and a flexible yoke extending from said brake applying member past the knuckle to said toggle means.

In testimony whereof, I hereunto affix my signature.

FREDERIC W. SLACK.